(12) United States Patent
Suzuki

(10) Patent No.: US 9,845,010 B2
(45) Date of Patent: Dec. 19, 2017

(54) VEHICULAR DISPLAY DEVICE

(71) Applicant: DENSO CORPORATION, Kariya, Aichi-pref. (JP)

(72) Inventor: Takamitsu Suzuki, Okazaki (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 134 days.

(21) Appl. No.: 14/782,811

(22) PCT Filed: Apr. 14, 2014

(86) PCT No.: PCT/JP2014/002098
§ 371 (c)(1),
(2) Date: Oct. 7, 2015

(87) PCT Pub. No.: WO2014/171124
PCT Pub. Date: Oct. 23, 2014

(65) Prior Publication Data
US 2016/0193921 A1  Jul. 7, 2016

(30) Foreign Application Priority Data

Apr. 16, 2013  (JP) ................................. 2013-085721

(51) Int. Cl.
*B60K 35/00* (2006.01)
*G02B 27/01* (2006.01)
(Continued)

(52) U.S. Cl.
CPC ................ *B60K 35/00* (2013.01); *B60R 1/00* (2013.01); *G02B 27/01* (2013.01); *G08G 1/166* (2013.01);
(Continued)

(58) Field of Classification Search
CPC ............ G02B 27/01; G02B 2027/0138; G02B 27/0101; G02B 27/0093;
(Continued)

(56) References Cited

U.S. PATENT DOCUMENTS 8,629,784 B2 * 1/2014 Szczerba ............... G01S 13/723
340/438
9,317,759 B2 * 4/2016 Inada ..................... B60K 35/00
(Continued)

FOREIGN PATENT DOCUMENTS

| JP | H08223566 A | 8/1996 |
| JP | H10035324 A | 2/1998 |

(Continued)

OTHER PUBLICATIONS

International Search Report and Written Opinion (in Japanese with English Translation) for PCT/JP2014/002098, dated May 20, 2014; ISA/JP.

*Primary Examiner* — Jason Holloway
(74) *Attorney, Agent, or Firm* — Harness, Dickey & Pierce, P.L.C.

(57) ABSTRACT

A vehicular display device includes: an information screen display device that displays an information screen on a display unit when a vehicle stops; a gazing point position identifying device that identifies a position of a driver's gazing point; a gazing point position determining device that determines whether a gazing point position is disposed on the display unit; a monitoring device that starts monitoring of a peripheral situation of the vehicle when the gazing point position is disposed on the display unit; a startable state determining device that determines whether the vehicle is in a startable state, based on the peripheral situation; a situation screen display device that displays a situation screen on a rear side of the information screen in a superimposed manner when the vehicle is in the startable state; and a transparentizing device that transparentizes the information screen.

7 Claims, 4 Drawing Sheets

(51) Int. Cl.
   *B60R 1/00* (2006.01)
   *G08G 1/16* (2006.01)

(52) U.S. Cl.
   CPC .. *B60K 2350/352* (2013.01); *B60K 2350/965* (2013.01); *B60R 2300/307* (2013.01)

(58) Field of Classification Search
   CPC .... G02B 2027/0181; B60K 2350/2052; B60K 2350/2056; B60K 2350/1096; B60K 2350/203; B60K 28/06; B60K 35/00; B60K 2350/965; B60K 2350/352; G08G 1/0962; G08G 1/166; G06K 9/00845; G06K 9/00791; G06K 9/00248; G06K 9/3241; G06K 9/00362; G06K 9/00832; B60R 2300/308; B60R 1/00; B60R 2300/307; B60W 2050/146; G01C 21/365; G01C 21/3697
   See application file for complete search history.

(56) References Cited

U.S. PATENT DOCUMENTS

| | | | |
|---|---|---|---|
| 9,513,702 B2* | 12/2016 | Cho | G06F 3/013 |
| 2007/0057781 A1* | 3/2007 | Breed | B60K 35/00 340/457.1 |
| 2008/0079753 A1* | 4/2008 | Victor | B60Q 9/008 345/660 |
| 2010/0023234 A1* | 1/2010 | Kameyama | B60W 30/08 701/70 |
| 2010/0253541 A1* | 10/2010 | Seder | G01S 13/723 340/905 |
| 2010/0253594 A1* | 10/2010 | Szczerba | G01S 13/723 345/7 |
| 2012/0046855 A1* | 2/2012 | Wey | G08G 1/09623 701/117 |
| 2014/0362202 A1* | 12/2014 | Tschirhart | G06K 9/00248 348/78 |
| 2015/0010207 A1* | 1/2015 | Inada | B60K 35/00 382/103 |
| 2016/0282940 A1* | 9/2016 | Hong | G06F 3/1446 |
| 2016/0311323 A1* | 10/2016 | Lee | B60K 37/06 |

FOREIGN PATENT DOCUMENTS

| | | |
|---|---|---|
| JP | 2000322699 A | 11/2000 |
| JP | 2003331397 A | 11/2003 |
| JP | 2005199892 A | 7/2005 |
| JP | 2005242606 A | 9/2005 |
| JP | 2007182117 A | 7/2007 |
| JP | 2008254710 A | 10/2008 |
| JP | 2009040319 A | 2/2009 |
| JP | 2012048345 A | 3/2012 |

* cited by examiner

VEHICULAR DISPLAY DEVICE

CROSS REFERENCE TO RELATED APPLICATIONS

This application is a U.S. National Phase Application under 35 U.S.C. 371 of International Application No. PCT/JP2014/002098 filed on Apr. 14, 2014 and published in Japanese as WO 2014/171124 A1 on Oct. 23, 2014. This application is based on and claims the benefit of priority from Japanese Patent Application No. 2013/085721 filed on Apr. 16, 2013. The entire disclosures of all of the above applications are incorporated herein by reference.

TECHNICAL FIELD

The present disclosure relates to a vehicular display device.

BACKGROUND ART

Up to now, a technique for providing an auxiliary function when a vehicle shifts from a stop state to a travel state has been considered. For example, Patent Literature 1 discloses a technique in which a peripheral situation of the vehicle is recognized, and a notification device operates when a preceding vehicle starts moving or when a traffic light changes to a green light.

Incidentally, in recent vehicular display devices, for example, with the development of the Internet and wireless communication technologies, various pieces of information can be accessed relatively freely. A screen for such information is configured to be displayed under a condition in which a vehicle is in a stop state from the viewpoint of safety. In the above configuration, when the vehicle shifts from the stop state to a travel state, that is, when the vehicle starts moving, a driver first moves his line of sight to a landscape outside of a vehicle from a state in which the line of sight is oriented to a display unit inside of the vehicle. The driver recognizes a situation around the vehicle with his own eyes, and starts the vehicle after confirming that the vehicle can start moving at his own discretion. In the above process, a time required until starting moving through recognition and confirmation is likely to be longer, and the recognition of the situation around the vehicle and the confirmation of whether the vehicle can start moving, or not, are likely to become insufficient. For that reason, a technique to enable the driver to be assisted in safely starting the vehicle from a state in which the driver watches the display unit inside of the vehicle has been increasingly developed.

PRIOR ART LITERATURES

Patent Literature

Patent Literature 1: JP-H08-223566 A

SUMMARY OF INVENTION

It is an object of the present disclosure to provide a vehicular display device which enables a vehicle to more safely start moving in displaying various information screens under a condition in which the vehicle is in a stop state.

According to an aspect of the present disclosure, a vehicular display device includes: an information screen display device that displays an information screen on a display unit under a condition that a vehicle is in a stop state; a gazing point position identifying device that identifies a position of a driver's gazing point as a gazing point position; a gazing point position determining device that determines whether the gazing point position identified by the gazing point position identifying device is disposed on the display unit; a monitoring device that starts monitoring of a peripheral situation of the vehicle when the gazing point position determining device determines that the gazing point position is disposed on the display unit; a startable state determining device that determines whether the vehicle is in a startable state, based on the peripheral situation monitored by the monitoring device; a situation screen display device that displays a situation screen indicative of the peripheral situation of the vehicle on a rear side of the information screen displayed by the information screen display device in a superimposed manner when the startable state determining device determines that the vehicle is in the startable state; and a transparentizing device that transparentizes the information screen.

According to the above vehicular display device, when the driver watches the information screen displayed on the display unit in the state where the vehicle stops, the screen displayed on the display unit shifts from the information screen to the situation screen, which is triggered when the vehicle becomes in the startable state. With the above configuration, the driver can sufficiently recognize the peripheral situation of the vehicle in a state where the driver is kept to gaze the display unit without moving the line of sight to a landscape outside of the vehicle, and can also sufficiently confirm that the vehicle is in the startable state. Therefore, the driver can more safely start the vehicle.

BRIEF DESCRIPTION OF DRAWINGS

The above and other objects, features and advantages of the present disclosure will become more apparent from the following detailed description made with reference to the accompanying drawings. In the drawings.

EMBODIMENTS FOR CARRYING OUT INVENTION

Figure 1:
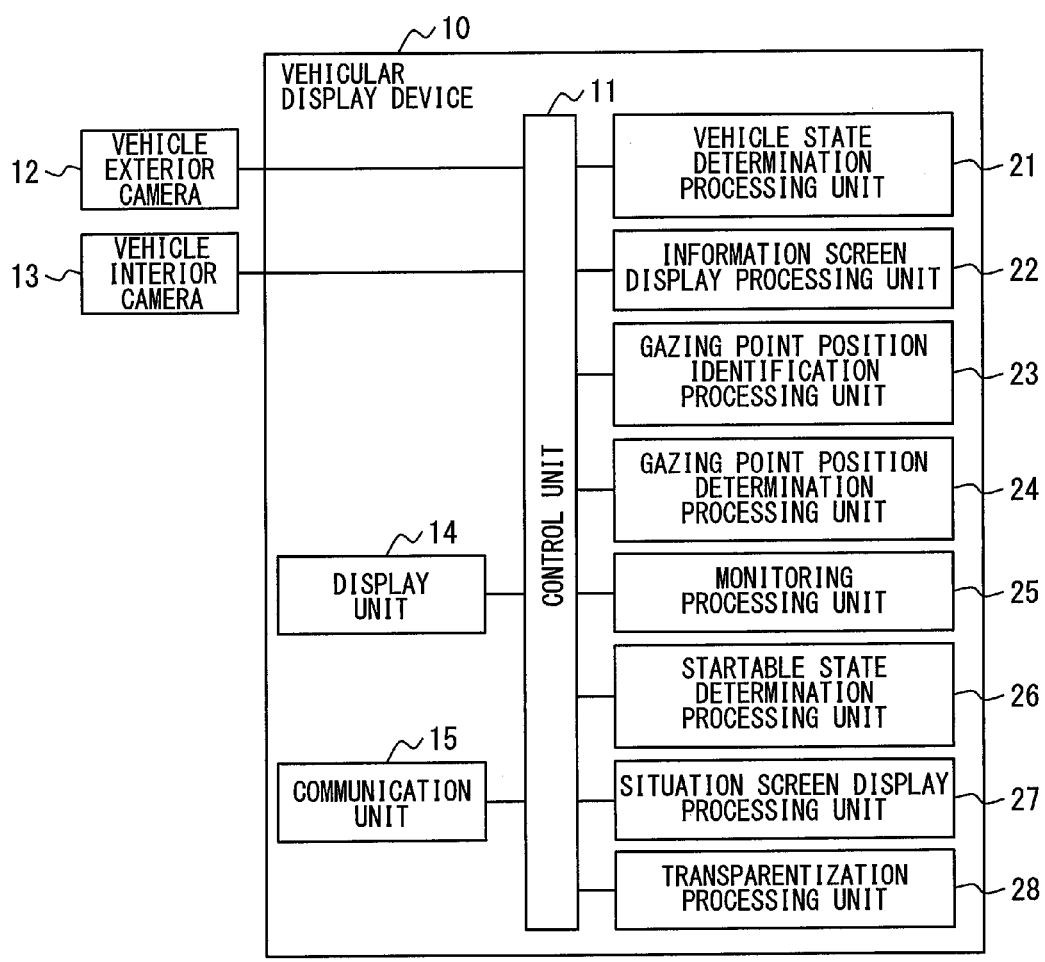
FIG. 1 is a block diagram illustrating a schematic configuration of a vehicular display device according to this embodiment.

An embodiment of the present disclosure will be described with reference to the drawings. A vehicular display device 10 (hereinafter referred to as "display device 10") illustrated in FIG. 1 includes a control unit 11, a vehicle exterior camera 12, a vehicle interior camera 13, a display unit 14, and a communication unit 15. The control unit 11 includes a CPU, a RAM, and a ROM not shown, and controls the overall operation of the display device 10. The control unit 11 executes a control program in the CPU, to thereby virtually realize a vehicle state determination processing unit 21, an information screen display processing unit 22, a gazing point position identification processing unit 23, a gazing point position determination processing unit 24, a monitoring processing unit 25, a startable state determination processing unit 26, a situation screen display processing unit 27, and a transparentization processing unit 28 by software. Those processing units 21 to 28 may be realized, for example, as an integrated circuit integral with the control unit 11 in a hardware manner.

The vehicle exterior camera 12 captures a situation around a vehicle in which the display device 10 is mounted, and outputs captured data to the control unit 11. In that case, the vehicle exterior camera 12 is disposed, for example, in front of the vehicle, and configured to capture a situation in front of the vehicle. The vehicle interior camera 13 is disposed, for example, in front of a driver's seat inside of the vehicle, captures the driver inside of the vehicle, and outputs captured data to the control unit 11.

The communication unit 15 is configured by, for example, a wireless communication module, and establishes a wireless communication circuit in cooperation with an external Internet access point or an external information communication device not shown to perform various communications. The display unit 14 includes, for example, a liquid crystal display or an organic EL display. The display unit 14 displays various information screens on the basis of various information data acquired from the external through the communication unit 15 by the control unit 11 or various information data provided in the control unit 11 in advance. It is conceivable that the information screen includes various screens such as a screen of e-mails, a screen of still images, a screen of moving images, and an execution screen of applications.

The vehicle state determination processing unit 21 detects whether the vehicle is in a stop state or in a travel state, on the basis of detection data output by a vehicle speed sensor not shown for detecting a speed of the vehicle. In that case, the vehicle state determination processing unit 21 determines that the vehicle is in the travel state if the speed of the vehicle is not 0 [km/h], and determines that the vehicle is in the stop state if the speed of the vehicle is 0 [km/h].

The information screen display processing unit 22 is an example of information screen display device, and allows various information screens to be displayed on the display unit 14 under a condition in which a state of the vehicle determined by the vehicle state determination processing unit 21 is in the stop state. In other words, when the vehicle is in the travel state, the information screen display processing unit 22 subjects the display unit 14 to display regulation. As a result, the display device 10 becomes in a state where various information screens cannot be displayed on the display unit 14. On the other hand, if the vehicle is in the stop state, the information screen display processing unit 22 cancels the display regulation to which the display unit 14 is subjected. As a result, the display device 10 becomes in a state where the various information screens can be displayed on the display unit 14.

The gazing point position identification processing unit 23 is an example of gazing point position identifying device, and executes a known gazing point analyzing process for identifying a gazing point position of the driver, to thereby identify the gazing point position of the driver, that is, a position gazed by the driver. In other words, the gazing point position identification processing unit 23 extracts eyeballs of the driver from the captured data that has been captured by the vehicle interior camera 13, identifies the line of sight of the driver from the motion or the state of the extracted eyeballs, and identifies the gazing point of the driver from the identified line of sight.

The gazing point position determination processing unit 24 is an example of gazing point position determining device, and determines whether the gazing point position identified by the gazing point position identification processing unit 23 is present on the display unit 14, or not, that is, whether the gazing point position falls within a frame of the display unit 14, or not. Display unit attribute data for identifying an installation position, a size, and a shape of the display unit 14 in the vehicle interior is stored in a storage medium not shown provided in the display device 10 in advance. The gazing point position determination processing unit 24 collates three-dimensional coordinate data indicative of the identified gazing point position with the display unit attribute data, to thereby determine whether the gazing point position is present on the display unit 14, or not.

The monitoring processing unit 25 is an example of monitoring device, and starts the monitoring of a situation around the vehicle by the vehicle exterior camera 12 if it is determined by the gazing point position determination processing unit 24 that the gazing point position is present on the display unit 14. In that case, the monitoring processing unit 25 is configured to monitor the situation in front of the vehicle.

The startable state determination processing unit 26 is an example of startable state determining device, and determines whether the vehicle is in a startable state, or not, on the basis of the situation around the vehicle which is monitored by the monitoring processing unit 25. In other words, the startable state determination processing unit 26 analyzes the data captured by the vehicle exterior camera 12, and determines that the vehicle is in the startable state when that a traffic light present in front of the vehicle changes from red to green, or that another vehicle that stops in front of the vehicle starts moving is identified.

The startable state determination processing unit 26 is configured to be determinable whether there is a sign that the vehicle can start moving, or not, on the basis of the situation around the vehicle monitored by the monitoring processing unit 25. In other words, the startable state determination processing unit 26 analyzes the captured data from the vehicle exterior camera 12, to thereby determine that there is the sign that the vehicle can start moving, for example, when that a traffic light on a road crossing in front of the vehicle changes from green to yellow or from yellow to red, or that tail lamps of another vehicle stopping in front of the vehicle turn off is identified.

A known analyzing process may be employed as the process for analyzing the captured data. In the determining process by the startable state determination processing unit 26, the display device 10 absolutely determines "whether the vehicle is in the startable state, or not", or "whether there is the sign that the vehicle can start moving, or not", on the basis of software processing. The determining process is different in significance from that the driver determines at his own discretion "whether the vehicle is in the startable state, or not", or "whether there is the sign that the vehicle can start moving, or not".

Figure 2:
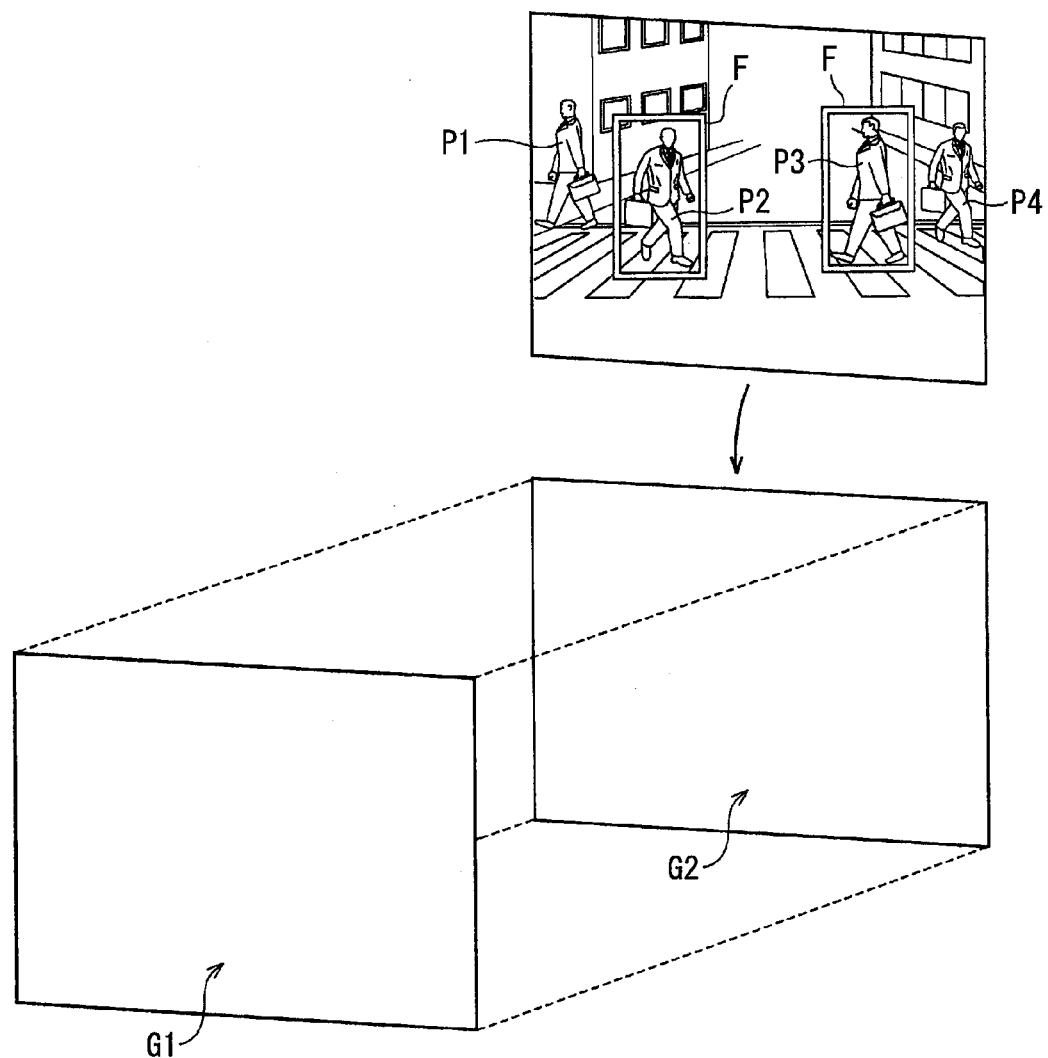
FIG. 2 is a diagram visually illustrating a state in which an information screen and a situation screen are displayed on each other in a superimposed manner.
Figure 3:
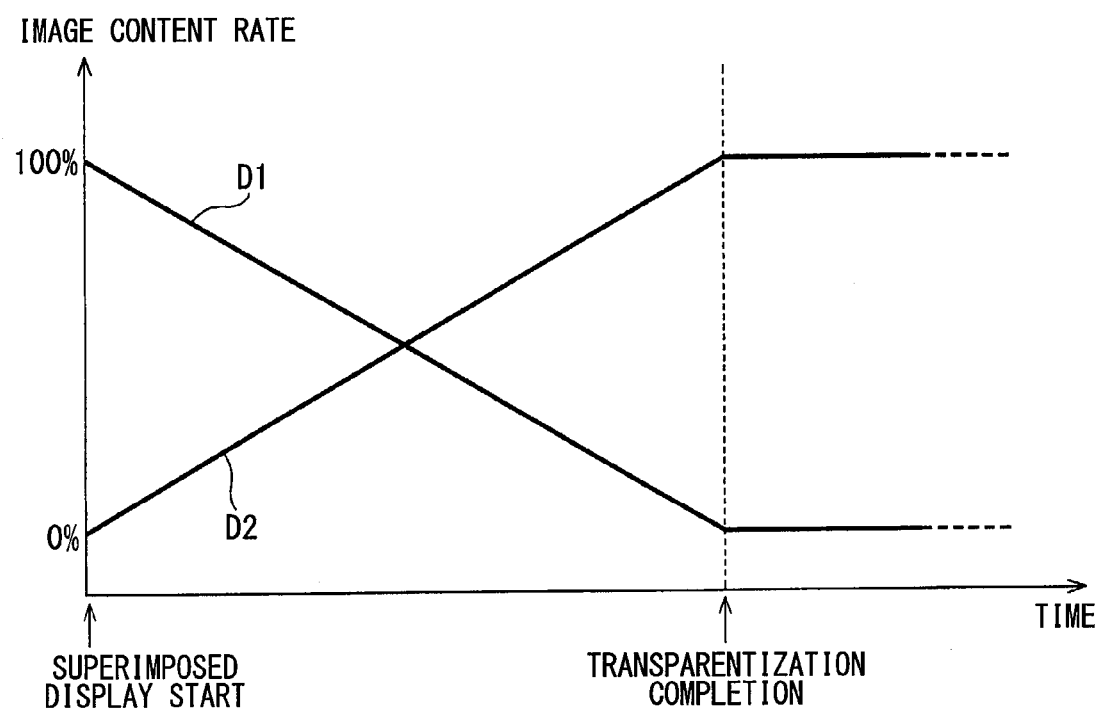
FIG. 3 is a diagram illustrating a content rate of image data which changes with an elapsed time from a start of a superimposed display.
Figure 4:
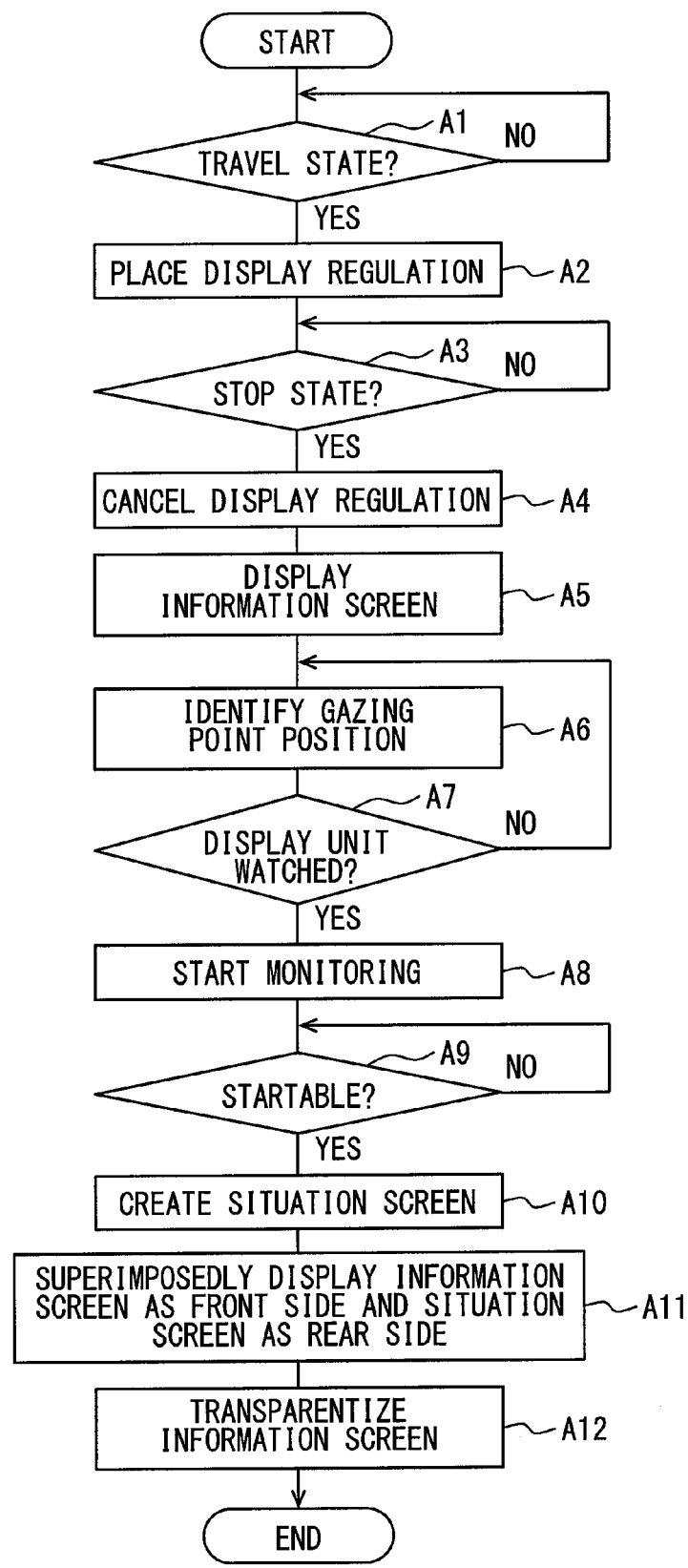
FIG. 4 is a flowchart illustrating an example of display processing in the vehicular display device.

The situation screen display processing unit 27 is an example of situation screen display device, and displays the situation screen visually indicative of the situation around the vehicle on the display unit 14 on the basis of the captured data from the vehicle exterior camera 12 when it is determined by the startable state determination processing unit 26 that the vehicle is in the startable state, or that there is the sign that the vehicle can start moving. For example, as illustrated in FIG. 2, in that case, the situation screen display processing unit 27 superimposes a situation screen G2 on a rear side of an information screen G1 on which the information screen display processing unit 22 is displayed, and displays the information screen G1 and the situation screen G2 on the display unit 14 in the superimposed manner. The superimposed display device that image data for the information screen G1 and image data for the situation screen G2 are combined together, and a combined screen based on the combined image data is displayed on the display unit 14. For example, as illustrated in FIG. 3, the situation screen display processing unit 27 displays the combined screen in which those two pieces of image data D1 and D2 are combined together, at the time of starting the superimposed display, with the inclusion of 100 percentages of image data D1 for the information screen G1 and 0 percentages of image data D2 for the situation screen G2. Therefore, at the time of starting the superimposed display, the display device 10 becomes in a state where only the information screen G1 appears on the display unit 14.

The situation screen display processing unit 27 analyzes the captured data from the vehicle exterior camera 12 to identify an object to be noted which is included in the situation screen G2. Further, the situation screen display processing unit 27 emphasizes the identified object. For instance, in the example illustrated in FIG. 2, the situation screen display processing unit 27 identifies a pedestrian included in the situation screen G2 as the object to be noted, and surrounds the pedestrian with a colored frame F for emphasis. In that case, the situation screen display processing unit 27 is configured to identify not all of pedestrians P1 to P2 included in the situation screen G2, but only the pedestrians P2 and P3 heading on a center of the screen, that is, a route of the vehicle as the objects to be noted. The frame F may be configured by a remarkable color such as yellow. For example, the object to be noted may be indicated by an arrow mark for emphasis. Whether the pedestrian heads on the center of the screen, or not, can be determined, for example, on the basis of a shape pattern of a silhouette of the pedestrian after the silhouette is identified by the process of analyzing the captured data.

The transparentization processing unit 28 is an example of transparentizing device, and gradually transparentizes the information screen G1 displayed on the display unit 14 over a predetermined period of time such as 1 second. In other words, for example, as illustrated in FIG. 3, the transparentization processing unit 28 gradually decreases a rate of the image data D1 for the information screen G1, and gradually increases a rate of the image data D2 for the situation screen G2 in the two pieces of image data to be combined by the situation screen display processing unit 27. With the above processing, a content rate of the image data D1 included in the combined image data gradually decreases, and a content rate of the image data D2 gradually increases. As a result, in the display unit 14, the information screen G1 is gradually transparentized, and the situation screen G2 is gradually actualized.

When it is determined by the startable state determination processing unit 26 that "there is the sign that the vehicle can start moving", the transparentization processing unit 28 is configured to match a time at which to complete the transparentization of the information screen G1 with a time at which the vehicle can actually start moving as much as possible. In other words, the transparentization processing unit 28 gradually transparentizes the information screen G1, for example, over a generally assumed period of time since the traffic light of the road crossing in front of the vehicle changes from green to yellow, or from yellow to red until a traffic light in a forward direction changes to green, or a generally assumed period of time since the tail lamps of the forward vehicle turn off until the forward vehicle actually starts moving.

Subsequently, an example of the display processing by the vehicular display device 10 will be described. In other words, if the vehicle is in the travel state (yes in A1), the display device 10 subjects the display unit 14 to display regulation (A2). If the vehicle becomes in the stop state (yes in A3), the display device 10 cancels the display regulation to which the display unit 14 is subjected (A4). When the display regulation is canceled, the display device 10 displays various information screens G1 on the display unit 14 (A5). The display device 10 identifies a gazing point position of the driver from the captured data from the vehicle interior camera 13 (A6). Further, the display device 10 determines whether the identified gazing point position is present on the display unit 14, or not, that is, whether the driver watches the display unit 14, or not (A7).

If the display device 10 determines that the driver does not watch the display unit 14 (no in A7), the display device 10 proceeds to the above Step A6. On the other hand, if the display device 10 determines that the driver watches the display unit 14 (yes in A7), the display device 10 starts the monitoring of the peripheral situation by the vehicle exterior camera 12 (A8). Further, the display device 10 determines whether the vehicle becomes in the startable state, or not, or whether there is the sign that the vehicle can start moving, or not, on the basis of the captured data from the vehicle exterior camera 12 (A9).

If the vehicle becomes in the startable state, or if the sign that the vehicle can start moving is detected (yes in A9), the display device 10 creates the situation screen G2 on the basis of the captured data from the vehicle exterior camera 12 (A10). Further, the display device 10 displays those two screens on the display unit 14 in the superimposed manner with the information screen G1 as a front side and the situation screen G2 as a rear side (A11). Further, after the display device 10 gradually transparentizes the information screen G1 (A12) to make the information screen G1 completely transparent, the display device 10 terminates the display processing. After the termination of the display processing, the display device 10 becomes in a state where only the situation screen G2 appears on the display unit 14.

According to the display device 10 of this embodiment described above, when the driver watches the information screen G1 displayed on the display unit 14 in a state where the vehicle stops, the screen displayed on the display unit 14 shifts from the information screen G1 to the situation screen G2 by being triggered by that the vehicle becomes in the startable state, or that there is the sign that the vehicle can start moving. With the above configuration, the driver can sufficiently recognize the peripheral situation of the vehicle in a state where the driver is kept to gaze the display unit 14 without moving the line of sight to a landscape outside of the vehicle, and can also sufficiently confirm that the vehicle is in the startable state. Therefore, the driver can more safely start the vehicle.

According to the display device 10, the information screen G1 is gradually transparentized over a predetermined period of time. As a result, the driver can sensuously grasp that the vehicle becomes in the startable state when the driver starts watching the situation screen G2. The predetermined period of time can be set with an appropriate change. According to the display device 10, the object to be noted which is included in the situation screen G2 is emphasized. With the above configuration, the driver can rapidly recognize a point to be noted when starting the vehicle.

According to the display device 10, it is determined whether the vehicle is in the startable state, or not, on the basis of the situation in front of the vehicle. According to the display device 10, the situation screen indicative of the situation in front of the vehicle is displayed. As described above, the determination processing of the startable state and the display processing of the situation screen are limited to the front higher in a likelihood that the vehicle advances. As a result, the function of assisting the vehicle in safely and smoothly starting moving while a processing load is reduced can be realized.

The present disclosure is not limited to the embodiments described above, and can be applied to various embodiments without departing from the spirit of the present disclosure. For example, the display device 10 may be configured to display the situation screen indicative of the situations of not only the front of the vehicle, but also the rear and the sides thereof, with the inclusion of the rear and the sides of the vehicle in the monitoring area.

The display device 10 may be configured to output a situation voice aurally representing the situation around the vehicle from an in-vehicle speaker not shown. As the situation voice, a voice representing such a situation that "there is a pedestrian heading on a course of the vehicle" is conceivable. The display device 10 may be configured to form a sound field on the right side by a stereo function of the in-vehicle speaker to output the situation voice when the captured data on a right side of the vehicle is analyzed to recognize the object to be noted.

In the drawings, reference numeral 10 denotes the vehicular display device, 14 is the display unit, 22 is the information screen display processing unit (information screen display device), 23 is the gazing point position identification processing unit (gazing point position identifying device), 24 is the gazing point position determination processing unit (gazing point position determining device), 25 is the monitoring processing unit (monitoring device), 26 is the startable state determination processing unit (startable state determining device), 27 is the situation screen display processing unit (situation screen display device), and 28 is the transparentization processing unit (transparentizing device).

It is noted that a flowchart or the processing of the flowchart in the present application includes sections (also referred to as steps), each of which is represented, for instance, as S100. Further, each section can be divided into several sub-sections while several sections can be combined into a single section. Furthermore, each of thus configured sections can be also referred to as a device, module, or means.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A vehicular display device comprising:
an information screen display device that displays an information screen on a display unit under a condition that a vehicle is in a stop state;
a gazing point position identifying device that identifies a position of a driver's gazing point as a gazing point position;
a gazing point position determining device that determines whether the gazing point position identified by the gazing point position identifying device is disposed on the display unit;
a monitoring device that starts monitoring of a peripheral situation of the vehicle when the gazing point position determining device determines that the gazing point position is disposed on the display unit;
a startable state determining device that determines whether the vehicle is in a startable state, based on the peripheral situation monitored by the monitoring device;
a situation screen display device that displays a situation screen indicative of the peripheral situation of the vehicle on a rear side of the information screen displayed by the information screen display device in a superimposed manner when the startable state determining device determines that the vehicle is in the startable state; and
a transparentizing device that transparentizes the information screen, wherein:
the situation screen display device combines an image data of the information screen and an image data of the situation screen, and displays a combined screen based on a combined image data on the display unit in the superimposed manner.

2. The vehicular display device according to claim 1, wherein:
the transparentizing device gradually transparentizes the information screen over a predetermined time period.

3. The vehicular display device according to claim 1, wherein:
the situation screen display device emphasizes an object to be noted which is included in the situation screen.

4. The vehicular display device according to claim 1, wherein:
the startable state determining device determines whether the vehicle is in the startable state, based on a situation in front of the vehicle monitored by the monitoring device.

5. The vehicular display device according to claim 1, wherein:
the situation screen display device displays the situation screen indicative of a situation in front of the vehicle.

6. The vehicular display device according to claim 1, wherein:
the transparentizing device controls the display unit to display only the information screen when the situation screen display device starts to display the situation screen and the information screen in the superimposed manner; and
the transparentizing device controls the display unit to display only the situation screen when the transparentizing device completes to transparentizes the information screen.

7. The vehicular display device according to claim 1, wherein:
the transparentizing device gradually decreases a rate of the image data of the information screen, and gradually increases a rate of the image data of the situation screen.

* * * * *